May 25, 1937. C. C. FARMER 2,081,700
FLUID PRESSURE BRAKE
Filed Aug. 24, 1935 2 Sheets-Sheet 2
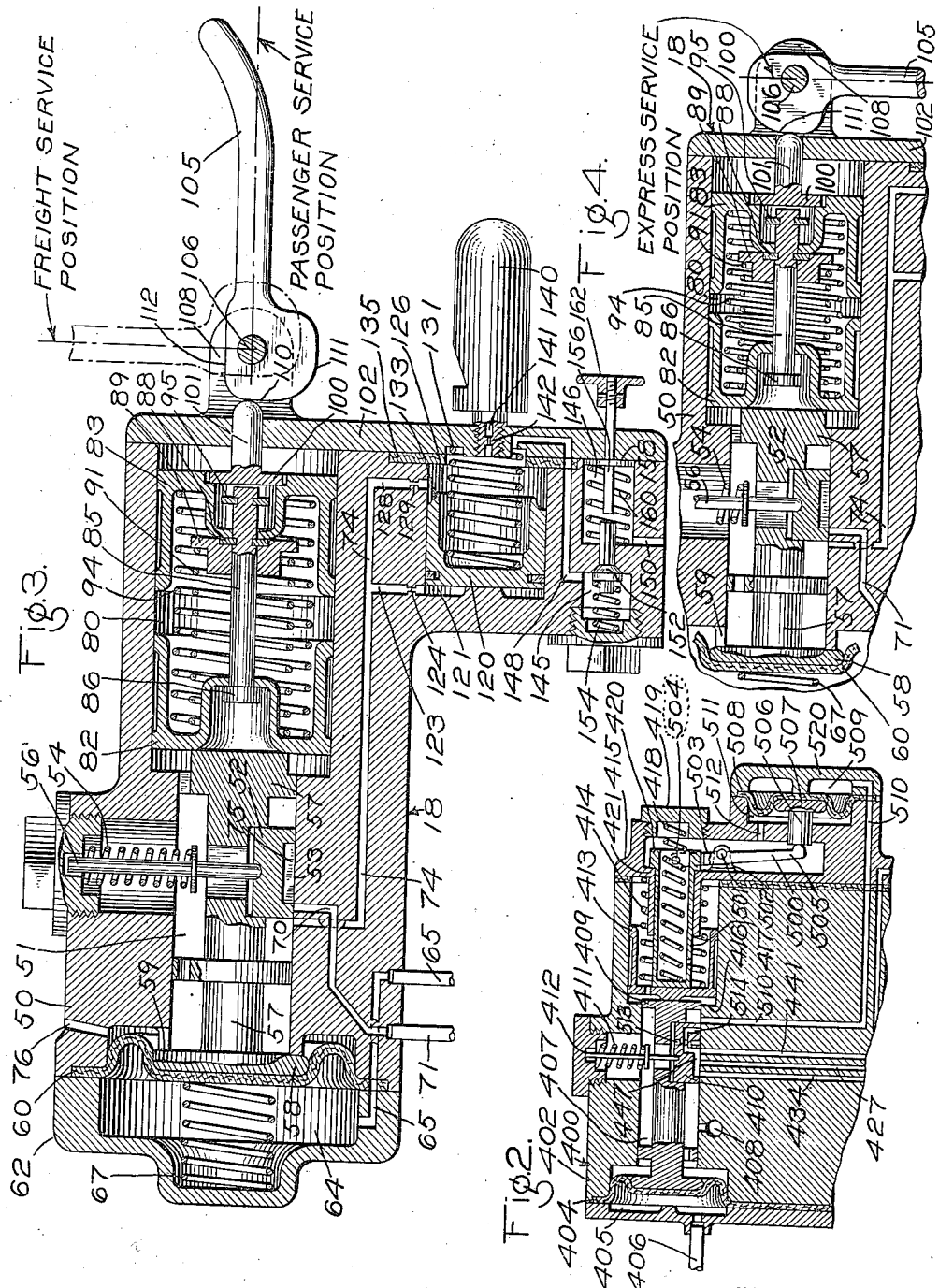
INVENTOR
CLYDE C. FARMER
BY Wm. M. Cady
ATTORNEY Patented May 25, 1937

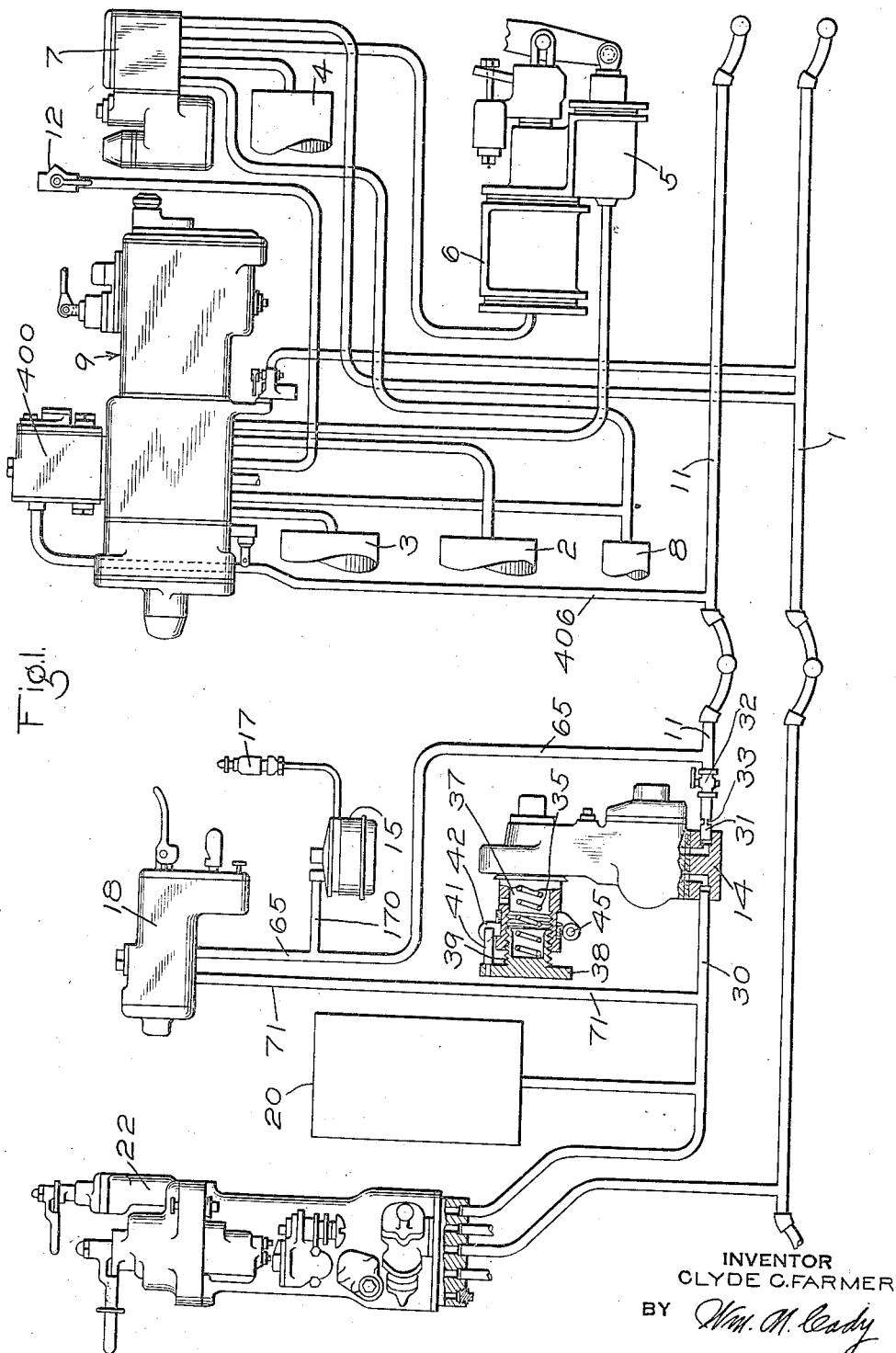

2,081,700

UNITED STATES PATENT OFFICE 2,081,700

FLUID PRESSURE BRAKE

Clyde C. Farmer, Pittsburgh, Pa., assignor to The Westinghouse Air Brake Company, Wilmerding, Pa., a corporation of Pennsylvania Application August 24, 1935, Serial No. 37,708

29 Claims. (Cl. 303—23)

This invention relates to fluid pressure brake equipments of the type which may be readily changed over or conditioned to meet the braking requirements of one or another of a plurality of classes of railway train service.

It is the principal object of this invention to provide a brake equipment having a change-over valve device associated therewith and operable in response to fluid under pressure supplied thereto by the signal pipe or other means in different predetermined ranges of pressure to condition the equipment for different classes of service, a signal controlled by means subject to and operated by a reduction in pressure of the fluid supplied to the change-over valve mechanism for effecting operation of the signal, and means for selectively conditioning the signal controlling means to operate in response to reductions in pressure below different ones of said predetermined ranges of pressure.

Another object of this invention is to provide means responsive to the pressure of the fluid in the signal pipe and adapted to operate a signal on a reduction in the pressure of the fluid in the signal pipe below a predetermined pressure.

It is a further object of this invention to provide a warning device controlled by means subject to and operated by a reduction in the pressure of the fluid in the signal pipe for effecting operation of the warning device, said means being adapted to be adjusted to effect operation of the warning device in response to reductions in the pressure of the fluid in the signal pipe below different predetermined pressures.

Another object of the invention is to provide a warning device of the type described, which upon a reduction in the pressure of the fluid in the signal pipe will continue to operate until the pressure in the signal pipe is restored, or until the operator acknowledges the signal.

A further object of the invention is to provide a signal controlled by means subject to and operated upon a reduction in the pressure of the fluid in the signal pipe to effect operation of the signal, and manually controlled means to cut off operation of the signal, said means being automatically controlled to restore control of the signal to the means responsive to the pressure of the fluid in the signal pipe on an increase in the pressure of the fluid in said pipe to a predetermined value.

Other objects of the invention and features of novelty will be apparent from the following description taken in connection with the accompanying drawings, in which Fig. 1 is a diagrammatic view of a fluid pressure brake equipment embodying the invention;

Fig. 2 is a fragmentary sectional view of a portion of the change-over mechanism employed in connection with the brake equipment shown in Fig. 1;

Fig. 3 is an enlarged diagrammatic sectional view of the warning device and control means therefor provided by my invention; and Fig. 4 is a fragmentary sectional view similar to Fig. 2 but showing the warning device control means conditioned for a different class of service than that for which it is shown in Fig. 2.

In the accompanying drawings the reference character 400 indicates a change-over valve device which is associated with a fluid pressure brake equipment adapted to be conditioned to meet the braking requirements of any one of a plurality of classes of train service, and is automatically operable in response to variations in the pressure of the fluid supplied thereto to effect such conditioning.

For illustrative purposes the change-over valve device 400 is shown associated with a fluid pressure brake equipment which, with the exception of the warning device provided by this invention, may be substantially identical with the equipment fully shown, described and claimed in my Patent No. 2,035,056. This brake equipment is adapted to be changed over or conditioned for either passenger train service, express train service, or freight train service.

As the brake equipment, with the exception of the warning device, is substantially identical with the equipment disclosed in the above mentioned application, the following detailed description will be limited largely to the warning device and its function, and the other parts of the equipment will be described briefly in order to bring out the cooperative relationship between the warning device and the remainder of the fluid pressure brake equipment.

The fluid pressure brake equipment shown in Fig. 1 of the drawings comprises a brake pipe 1, an auxiliary reservoir 2, an emergency reservoir 3, a supply reservoir 4, a take-up cylinder device 5, a brake cylinder 6, a relay valve device 7, a volume reservoir 8, a brake controlling valve mechanism 9 having the change-over device 400 associated therewith, a signal pipe 11, a retaining valve device 12, a feed valve device 14, a signal valve 15, a signal whistle 17, a warning valve 18, a main reservoir 20, and an engineer's brake valve 22.

In the installation of this equipment on a train the engine is equipped with a feed valve device 14, a signal valve 15, a signal whistle 17, a warning valve 18, a main reservoir 20, and an engineer's brake valve 22, while each of the cars is the train is equipped with an auxiliary reservoir 2, an emergency reservoir 3, a supply reservoir 4, a take-up cylinder device 5, a brake cylinder 6, a relay valve device 7, a volume reservoir 8, and a brake controlling valve device 9 having the change-over device 400 associated therewith.

The change-over mechanism 400 is shown in detail in Fig. 2 of the drawings, and is responsive to the pressure of the fluid in the signal pipe 11. The change-over mechanism employed in the system disclosed in this application is disclosed and claimed in my Patent No. 2,035,056.

In order to simplify the drawings and the description of the present invention the parts of the present equipment which correspond to those of the equipment disclosed in the aforementioned pending application are identified by the same reference characters as used in the said pending application.

The change-over device 400 comprises a casing 402 which, in the present embodiment of the invention, may be secured to the brake controlling valve mechanism in any desired manner and comprises a change-over valve mechanism, (not shown), and a control mechanism for controlling the operation of the change-over valve mechanism.

The control mechanism just referred to comprises a movable abutment in the form of a diaphragm 404 having at one side a chamber 405 which is connected through a pipe 406 to the signal pipe 11, and having at the other side a chamber 407 which is constantly connected to a passage 408 leading to the atmosphere.

Contained in the chamber 407 is a stem 409 which is operative to control movement of a control slide valve 410 also contained in the chamber 407, said slide valve being urged against the slide valve seat by a spring 411 acting through the medium of a plunger 412.

The forward end of the stem 409 is operatively engaged by the diaphragm 404 and the rear end is adapted to be engaged by a combined actuating and stop member 413 which is slidably mounted in a bore in the casing, and which is subject to the action of a spring 414, which is interposed between and operatively engages the stop member and a cover plate 415 secured to one end of the casing, said spring tending at all times to urge the member toward a shoulder 416 formed on the casing, and which is adapted to limit movement of the member in the direction of the stem 409.

Slidably mounted in a bore in the cover plate 415 is a stop member 417 which is constantly subject to the pressure of a spring 418 interposed between and engaging the stop member 417 and a plug 419 having screw-threaded connection with the cover plate 415, said spring at all times tending to urge the stop member in a direction towards the stop member 413, movement of the stop member 417 in this direction being limited by engagement of an annular flange 420 formed thereon with a stop shoulder 421 formed on the cover plate 415.

With the member 413 in engagement with the stop shoulder 416, and the flange 420 of the member 417 in engagement with the stop shoulder 421, the free end of the member 417 will be spaced a short distance away from the member 413.

As will hereinafter more fully appear the spring 414 alone acts through the medium of the member 413 and yieldably resists movement of the stem 409 and the slide valve 410 in a direction towards the right hand until such time as the member 413 engages the stop member 417, after which the spring 414 and the spring 418, which acts through the medium of the member 417, together yieldably resist movement of the stem and the slide valve to the right.

The spring 414 is of such a value that a fluid pressure of 10 pounds in the diaphragm chamber 405 will, through the medium of stem 409, maintain the member 413 in engagement with the end of the member 417, and the spring 418 is of such a value that it will not yield to the action of the stem 409 unless the pressure of the fluid in the chamber 405 is above 45 pounds.

For the purpose of controlling the control valve mechanism in its express train service position, that is, to the position to which it is moved when the pressure of the fluid in the signal pipe 11 is above 45 pounds, against its unintentional return by the action of the spring 418 and the member 417 to passenger position, that is, to the position which it assumes when the pressure of the fluid in the signal pipe 11 is below 45 pounds, a mechanism is provided comprising a lever 500, which is pivotally mounted intermediate its ends on the pin 501, which is supported in spaced lugs 502 carried by the casing section 415. The end 503 of the arm 500 is forked so as to pass partially around the member 417, and the ends of the tines of this portion of the lever are pivotally connected to the member 417 by means of trunnions 504, which may be in the form of bolts having screw-threaded connection with the member.

The arm 505 of the lever 500 is adapted to be operatively engaged by the stem 506 of a follower member 507, which is operatively engaged by a flexible diaphragm 508 clamped between the cover plate 415 and a cap plate 520 secured to the cover plate.

At one side of the diaphragm 508 there is a chamber 509 which is constantly connected to a passage 510 leading to the seat for control slide valve 410, and at the other side of the diaphragm there is a chamber 511 which is open to the atmosphere by way of a passage 512, the chamber 407 and the passage 408.

The seat of the slide valve 410 has connected thereto control passages 434, 427, and 441, while the slide valve 410 has a cavity 447 formed therein and adapted in different positions of the slide valve to establish communication between the passages in the slide valve seat. The slide valve 410, in addition, has a port 514 extending therethrough, and a port 513 which communicates with the cavity 447, and with the face of the slide valve 410.

When the slide valve 410 is in the position which it assumes when the stop member 413 is in engagement with the end of the stop member 417 and the flange 420 of the stop member 417 is in engagement with the shoulder 421, which is the position in which the slide valve is shown in Fig. 2 of the drawings, and to which it is moved when fluid under pressure is supplied to the diaphragm chamber 405 at a pressure above 10 pounds and below 45 pounds, the cavity 447 in the slide valve establishes communication between the passage 427, and the passages 434 and 441, and fluid supplied to the passage 427 flows to the passages 434 and 441 and therefrom to mechanism, (not shown), which conditions the brake controlling valve device 9 for operation in passenger train service.

When the slide valve 410 is in the position which it assumes when the stop member 413 is in engagement with the shoulder 416, which is the position to which it is moved when the pressure of the fluid supplied to the diaphragm chamber 405 is less than 10 pounds, the cavity 447 in the slide valve establishes communication between the passage 427 and the passage 434, while the port 513 in the slide valve communicates with the passage 441 and connects this passage with the valve chamber 407 and thereby with the atmosphere by way of passage 408. When the slide valve 410 is in this position the brake controlling valve device 9 will be conditioned for operation in freight train service.

When fluid under pressure is supplied to the diaphragm chamber 405 at a pressure above 45 pounds the slide valve 410 is shifted to the right from the position in which it is shown in Fig. 2 of the drawings, the stem 409 pressing the stop member 413 against the end of the stop member 417 and moving the stop member 417 against the spring 418. As a result of this movement of the slide valve 410 the cavity 447 therein establishes communication between the passage 427 and the passage 434, and also between the passage 427 and the passage 510, while the end of the slide valve uncovers the passage 434 so that this passage is connected to the valve chamber 407 and thereby to the atmosphere by way of the passage 408. When the slide valve 410 is in this position the brake controlling valve device 9 will be conditioned for service on express trains.

The fluid which is supplied to the passage 510 flows to the chamber 509 where it acts upon the diaphragm 508, and presses the follower 507 against the end 505 of the lever 500, causing this lever to pivot on the pin 501. This movement of the lever 500 moves a stop member 417 to the right against the spring 418 and reduces the force required to maintain the stem 409 and the slide valve 410 in this position.

The feed valve device 14 may be of any well known construction, and, in the system shown in the drawings, is connected by way of the pipe 30 to the main reservoir 20, and has its discharge passage connected to the signal pipe 11 by way of a pipe 31 having a choke or restricted portion 33 interposed therein. The pipe 31 has a valve 32 interposed therein for controlling the flow of fluid from the feed valve 14 to the signal pipe 11.

The feed valve device 14 has associated therewith adjusting means comprising a spring 35, mounted in a bore 37 in the housing of the feed valve device and having one end abutting against an adjustable member 38 which has a threaded portion 39, which is adapted to be screwed into the internal threads in the bore 37 in the housing.

The adjustable member 38 has a stop pin 41 associated therewith, which is adapted on rotation of the adjustable member 38 in one direction to engage a stop 42 to limit movement of the adjustable member 38 in this direction, and on movement of the adjustable member 38 in the opposite direction the stop pin 41 engages a stop 45 to limit rotation of the adjustable member in this direction.

The degree of compression of the spring 35 is varied when the adjustable member 38 is rotated, and when the stop pin 41 is in engagement in one of the stops, the feed valve device will be conditioned to maintain the pressure of the fluid in the signal pipe 11 at a value between 10 and 45 pounds, and when the adjustable member 38 is moved to a position in which the stop pin 41 engages the other of the stops, the feed valve 14 will be conditioned to supply fluid under pressure to the signal pipe 11 to maintain the pressure of the fluid in this pipe at a value above 45 pounds, such as at 90 pounds.

The warning valve 18 comprises a casing indicated generally by the reference numeral 50, and having formed therein a slide valve chamber 51, in which is positioned a slide valve 52 which is slidable upon a seat 53 formed within the chamber 51. The slide valve 52 is normally urged into engagement with the seat 53 by means of a spring 54 acting through a stem 56.

The slide valve 52 is operated by means of a stem 57 which has an enlarged end 58 on one end thereof, which is adapted to engage a stop 59 formed on the body 50 to limit movement of the stem to the right as viewed in Fig. 3 of the drawings. The other face of the head 58 is engaged by a diaphragm 60 which is clamped between the body 50 and a casing section 62, and which cooperates with the diaphragm 60 to form a chamber 64 which is constantly connected to the signal pipe 11 by way of the passage and pipe 65. A spring 67 is positioned in the chamber 64 and extends between the casing section 62 and the diaphragm 60 and normally urges the stem 57 to the right, so that the head 58 is in engagement with the stop 59.

The slide valve seat has a port 70 therein which is constantly connected with the main reservoir 30 by way of a pipe 71. In addition, the slide valve seat 53 has a port formed therein and communicating with a passage 74, while the slide valve 52 has a cavity 75 therein which is adapted in certain positions of the slide valve to establish communication between the ports 70 and 74. The port 74 is adapted in one position of the slide valve 52 to communicate with the valve chamber 51, and thereby with the atmosphere by way of a passage 76.

The body 50 has a bore 80 formed therein and located substantially in alignment with the valve chamber 51 and a plunger 82 is slidably mounted therein and adapted to engage the end of the stem 57.

The bore 80 in addition has a plunger 83 slidably mounted therein and the plungers 82 and 83 are connected by means of a rod 85 which extends through openings in the recessed central portions of the plungers 82 and 83. This rod has on one end thereof a head 86, and has secured thereon adjacent the other end by means of a locking ring 88, a spring seat 89.

A spring 91 extends between the spring seat 89 and the plunger 82, while a spring 94 extends between the plungers 82 and 83.

The rod 85, in addition, has secured thereon, adjacent the end thereof, a locking ring 95, which is adapted to be engaged by the face of the plunger 83 to limit movement of the plunger 83 away from the plunger 82.

The face of the plunger 83 is provided with a recessed portion which is adapted to receive the head 100 of the plunger 101, which is slidably mounted in an opening in the casing cover section 102, and which has a rounded end portion which is adapted to be engaged by cam surfaces on the operating handle 105, which is pivotally supported on a pin 106 carried by ears 108 formed integral with the casing cover section 102.

The operating handle 105 has a plurality of cam surfaces formed thereon, and adapted to engage the end of the stem 101 of the plunger 100, and these cam surfaces include a cam surface 110, a cam surface 111, and a cam surface 112, which are joined by curved intermediate portions. The cam surface 111 is positioned somewhat further from the axis upon which the operating handle 105 pivots than is the cam surface 110, while the cam surface 112 is positioned much nearer this axis than the cam surface 110.

The cam surface 110 is so proportioned that when the stem 57 is in the position in which the head 58 is in engagement with the stop 59, and the cam surface 110 is moved into engagement with the end of the plunger 101, the plunger 83 will be moved to the left a short distance so as to compress the spring 94 somewhat, but the plunger 83 will not be moved sufficiently to cause the central portion of the plunger to engage the spring seat 89 to effect compression of the spring 91.

The cam surface 111 is proportioned so that when this cam surface is moved into engagement with the end of the plunger 101, the plunger 83 will be moved to the left a somewhat greater distance than it is moved by the cam surface 110 and will engage the spring seat 89 and move this spring seat to the left thereby compressing the spring 91, the rod 85 sliding in the bore in the plunger 82 in which it is mounted so that head 86 moves away from the face of the plunger 82 a short distance as is clearly shown in Fig. 4 of the drawings.

The cam surface 112 is proportioned so that when the handle 105 is turned to the freight service position, which is the position indicated by broken lines in Fig. 3 of the drawings, the plunger 101 will be permitted to move to the right a sufficient distance to permit the plunger 83 to be moved by the spring 94 into engagement with the locking ring 95. When the plunger 83 is moved to this position the plungers 82 and 83 are held by the rod 85 against further movement apart, and the spring 94 will not exert any force on the plunger 82 tending to move this plunger to the left and thereby move the stem 57 to the left. The stem 57, therefore, will be held in the position in which it is shown in Fig. 3 of the drawings by the spring 67, in which position the slide valve 52 laps the passage 70 leading from the main reservoir 20, while it uncovers the end of the passage 74.

The body 50 has a bore therein in which is mounted a valve piston 120 having on one side thereof an operating chamber 121 which is connected to the passage 74 by way of a passage 123 having a choke 124 therein. The valve piston 120 has on the other side thereof a signal or control chamber 126 which, when the valve piston is in the position in which it is shown in the drawings, is connected to the passage 74 by way of a passage 128 having a choke or restricted portion 129 interposed therein.

The valve piston 120 is normally urged to the left by means of a spring 131 extending between the valve piston and the casing section 102, while the face of the valve piston 120 is provided with a seat rib 133 which is adapted to seat on a seating gasket 135 clamped between the casing cover section 102 and the body member 50.

A signal whistle 140 is provided which is supplied with fluid under pressure by way of a passage 141 having a choke or restricted portion 142 interposed therein and communicating with the chamber 126 on the right hand side of the valve piston 120 at a point inwardly of the seat rib 133 on the valve piston 120.

The body 50 has a pair of chambers 145 and 146 formed therein, the chamber 145 communicating by way of a passage 148 with the signal or control chamber 126 at a point inwardly of the seat rib 133 on the valve piston 120, while the chamber 146 is constantly connected to the atmosphere by way of a passage 150. A valve element 152 is positioned in a bore in the body 50 communicating with the chamber 145 and the chamber 146 and is adapted to seat upon a seat surrounding this bore. The valve element 152 is urged into engagement with its seat by means of a spring 154, while the end of the stem of the valve is adapted to be engaged by the end of a plunger 156, which is slidable in an opening in the casing cover section 102 and which has a collar 158 formed thereon which is engaged by a spring 160 and which normally urges the plunger to the right, as viewed in Fig. 3 of the drawings.

The end of the plunger 156 is provided with a knob 162, and when the knob is pressed toward the casing cover section 102 the end of the stem 156 engages the stem of the valve element 152 so that the valve element is moved away from its seat against the spring 154 so as to permit fluid to escape from the chamber 145 to the atmosphere.

The system also includes a signal valve 15 which is constantly connected to the signal pipe 11 by way of a pipe 170, which connects with the pipe 65 leading to the warning valve 18. The signal valve 15 operates in response to reductions in the pressure of the fluid in the signal pipe and controls the supply of fluid from the signal pipe to the signal whistle 17.

The signal valve 15 forms no part of the present invention, and any well known device for this purpose may be employed, such as the signal valve device shown in Patent No. 2,028,605, of Ellis E. Hewitt, issued January 21, 1936.

The operation of the system when conditioned for service on express trains will now be described.

When employed in express train service the valve 32 is opened and the feed valve 14 is adjusted by turning an adjustable member 38 to one of the stops associated therewith so as to supply fluid under pressure to the signal pipe 11 to maintain the pressure of the fluid therein at a suitable pressure above 45 pounds, such as 90 pounds, and fluid from the signal pipe will flow by way of the pipe 406 to the chamber 405 in the change-over mechanism 400 associated with each of the brake controlling valve devices of each of the cars throughout the train.

As a result of the increase in the pressure of the fluid in the chamber 405 in the change-over valve mechanism the stem 409 will be moved to the right so that the slide valve 410 is moved to a position in which the cavity 447 establishes communication between the passages 427 and 441, and in which the passage 514 in the slide valve 410 is in communication with the passage 519, while the end of the slide valve 410 uncovers the port associated with the passage 434.

At the same time the end of the stem 409 engages the plunger 413 and moves this plunger against the spring 414 and also moves the plunger 413 into engagement with the plunger 417 and causes this plunger to be moved against the spring 418.

On movement of the slide valve 410 to the position in which communication is established between the passages 427 and 441, and in which the passage 434 is connected to the valve chamber 407 and thereby to the atmosphere by way of the passage 406, the brake controlling valve device 9 will be conditioned by the change-over valve mechanism, (not shown), for operation in express service.

At the same time the operating handle 105 of the warning valve 10 is moved to the position in which the cam surface 111 is in engagement with the end of the plunger 101, that is, to the position in which it is illustrated in Fig. 4 of the drawings. When the operating handle 105 is turned to this position the plunger 101 is forced inwardly so that the plunger 83 is moved towards the plunger 82 to compress the spring 94, and also so that the plunger 83 is moved into engagement with the spring seat 89 and forces this spring seat toward the plunger 82 to compress the spring 91, with the result that the stem 57 will be urged to the left by both of the springs 91 and 94.

Fluid under pressure from the signal pipe 11 flows by way of the pipe 65 to the chamber 64 in the warning valve 10, and as long as the pressure in this chamber exceeds a predetermined pressure, such as 45 pounds, the force exerted by the fluid under pressure acting on the diaphragm 60 will be sufficient to maintain the stem 57 in the position in which the head 58 engages the stop 59, which is the position in which it is shown in Fig. 3 of the drawings, in which position the slide valve 52 uncovers the end of the passage 74 so that this passage is connected to the atmosphere by way of the valve chamber 51 and the atmospheric passage 76.

If, for any reason, the pressure of the fluid in the signal pipe 11 should fall below the predetermined pressure, which would result in the change-over mechanism 400 operating to change the brake controlling valve device 9 for operation in a different class of service, the force exerted by the fluid under pressure in the chamber 64 and acting on the diaphragm 60 will decrease, with the result that the force exerted by the springs 91 and 94 acting through the plunger 82 upon the stem 57 will exceed that of the fluid pressure acting on the diaphragm 60, and the stem 57 will be shifted to the left as viewed in Fig. 3 of the drawings, thereby moving the slide valve 52 to a position in which the cavity 75 establishes communication between the passage 70, which is connected to the main reservoir 20 by way of the pipe 71 and the passage 74, thereby permitting fluid to flow from the main reservoir to the passage 74.

Fluid which is supplied to the passage 74 flows therethrough to the passage 123 and thereby through the choke 124 to the operating chamber 121 on the left hand side of the valve piston 120. Fluid which is supplied to the passage 74 also flows by way of the passage 128 and the restricted portion or choke 129 to the signal or control chamber 126 on the right hand side of valve piston 120 and therefrom by way of the passage 148 to the chamber 145. The fluid which is supplied to the chamber 126 also flows therefrom by way of the passage 141 and the choke 142 to the whistle 140 where it produces an audible warning notifying the operator of the fact that the pressure of the fluid in the signal pipe 11 has fallen below the pressure for which the warning valve has been adjusted to respond.

The choke 142 is of such capacity that the rate of flow of fluid from the signal or control chamber 126 to the whistle 140 through this choke will be much less rapid than the rate of flow of fluid from the passage 74 to the chamber 126 through the choke 129. As a result, therefore, of the greater rate of flow of fluid to the chamber 126 than the rate at which fluid is permitted to flow therefrom to the whistle 140, a pressure will be maintained in the chamber 126 on the right hand side of the valve piston 120, which together with the pressure of the spring 131, is sufficient to maintain valve piston 120 in the position in which it is shown against the opposing pressure of fluid in the operating chamber 121 on the opposite side of the valve piston.

The warning valve has means associated therewith by which the operator may acknowledge the signal and cut off operation of the signal. This may be accomplished by pressing on the knob 160, which forces the plunger 156 to the left against the spring 162 so that the end of the plunger engages the stem associated with the valve element 152, and thereupon on further movement of the plunger 156 the valve element 152 will move away from its seat against the spring 154. This permits fluid under pressure to escape from the chamber 145 to the atmosphere by way of the chamber 146 and the passage 150.

On the release of fluid from the chamber 145 fluid will also be released from the chamber 126, which is connected with the chamber 145 by way of the passage 148, which has a flow capacity substantially greater than the choke 129 through which fluid is supplied to the chamber 126. This results in a reduction in the pressure of the fluid in the chamber 126, whereupon the valve piston 120 will be moved to the right against the spring 131 by the fluid under pressure in the chamber 121 on the left hand side of the valve piston, and the seat rib 133 will be moved into engagement with the gasket 135 to cut off the further supply of fluid under pressure to the chamber 126 and thereby interrupt operation of the whistle 140.

The valve piston 120 will be maintained in this position, that is, in the position in which the seat rib 133 is in engagement with the gasket 135, as long as the pressure of the fluid in the chamber 121 is maintained.

On the release of manually applied pressure from the knob 162, the plunger 156 will be returned to the position in which it is shown in the drawings by the spring 160, while the valve element 152 will be moved to the seated position by the spring 154 so as to cut off the release of fluid under pressure from the chamber 145 to the atmosphere.

When the pressure of the fluid in the signal pipe 11 is restored to the proper value a similar increase in the pressure of the fluid in the chamber 64 will be effected, and the force exerted by the fluid under pressure acting on the diaphragm 60 will cause the stem 57 to be moved to the right against the plunger 82, which is pressed to the left by the springs 91 and 94.

On movement of the plunger 57 to the right the slide valve 52 will be moved to the position in which it is shown in the drawings, in which position the end of the slide valve uncovers the end of the passage 74 so that this passage is connected to the valve chamber 51 and thereby to the atmosphere by way of the passage 76. At the same time the supply of fluid under pressure to the passage 74 from the passage 70 is cut off, so that the further supply of fluid under pressure to the signal whistle 140 will be interrupted and the whistle will cease to operate.

If the operator has acknowledged the signal and the operation of the whistle 140 has been cut off by movement of the valve piston 120 into engagement with the gasket 135, then on movement of the slide valve 52 to the position in which the passage 74 is connected to the atmosphere, the fluid under pressure in the chamber 121 on the left hand side of the valve piston 120 will escape to the atmosphere and the valve piston 120 will be returned to the position in which it is shown in the drawings by the spring 131 so that the whistle will be automatically conditioned for operation in the event that there is another reduction in the pressure of the fluid in the signal pipe 11, which causes the stem 57 to be moved to a position in which the slide valve again establishes communication between the passage 70 and the passage 74.

The warning valve 18 may also be conditioned to operate to warn the operator if the pressure in the signal pipe 11 falls below the pressure employed in conditioning the apparatus for passenger service. In order to condition the warning valve for passenger train service the handle 105 is turned to the position in which the cam surface 110 is in engagement with the stem of the plunger 101, which is the position in which the handle 105 is shown in Fig. 3 of the drawings. When the handle 105 is turned to this position the plunger 83 is moved to the left a distance sufficient to compress the spring 94 somewhat, but not sufficient to effect compression of the spring 91, with the result that the stem 57 will be urged to the left only by the spring 94.

In addition the adjustable member 38 of the feed valve device 14 is turned to the position in which the feed valve is conditioned to maintain the pressure in the signal pipe 11 at the pressure which is employed for passenger train service, which may be 45 pounds.

Assuming that the proper pressure is maintained in the signal pipe 11, the pressure of the fluid in the chamber 64 of the warning valve 18 acting on the diaphragm 60 will maintain the stem 57 in the position in which it is shown in the drawings.

At the same time the pressure of the fluid in the chamber 405 of the change-over mechanism 400 acting on the diaphragm 404 will force the stem 409 to the right, and the force exerted on the stem 409 will be sufficient to move the stem to the right against the plunger 413, which is held by the spring 414, a distance sufficient to move the plunger into engagement with the plunger 417, but the force exerted by the fluid acting on the diaphragm 404 will be insufficient to move the plunger 413 against the plunger 417, which is held by the spring 418.

The stem 409 will thus be moved to the position in which it is shown in Fig. 2 of the drawings, in which position the slide valve 410 establishes communication between the passages 427 and the passages 434 and 441, while the end of the slide valve 410 uncovers the passage 510. Movement of the slide valve 410 to this position causes the change-over valve mechanism, (not shown), to condition the brake controlling valve device 9 for operation in passenger train service.

If the pressure in the signal pipe 11 now falls below the value determined by the spring 94 the warning valve 18 will operate in the manner described in detail above to supply fluid under pressure to the warning whistle 140 and thereby notify the operator of the reduction in the pressure of the fluid in the signal pipe.

The system provided by this invention also includes a signal device which is responsive to variations in the pressure of the fluid in the signal pipe 11 so that a signal may be transmitted to the engine by the release of fluid from the signal pipe 11 at any point throughout the train.

The signal means comprises a signal valve 15 which operates in response to a reduction in the pressure of the fluid in the signal pipe 11 to supply fluid to the signal whistle 17 for a predetermined time interval.

The feed valve 14 supplies fluid under pressure to the signal pipe 11 through the choke 33 with the result that the rate of supply of fluid to the signal pipe is insufficient to immediately overcome a reduction in the pressure of the fluid in the signal pipe effected by a release of fluid therefrom.

When the apparatus disclosed in this application is used in freight train service, communication from the feed valve to the signal pipe is cut off by means of the valve 32, and the fluid is released from the signal pipe in the cars. The consequent reduction in the pressure of the fluid in the chamber 405 of the change-over mechanism 400 permits the stem 409 to be moved to the left, as viewed in Fig. 2 of the drawings, by the spring 414 acting through the plunger 413.

The slide valve 410 will thereupon be moved to a position in which the cavity 447 establishes communication between the passages 427 and 434, and in which the port 513 establishes communication between the port 441 and the valve chamber 407 and thereby with the atmosphere by way of the port 408. When the slide valve 410 is in this position the brake controlling valve device 9 will be conditioned for freight train service by the change-over valve mechanism, (not shown).

At the same time the operating handle 105 is turned to the freight service position, in which position the plunger 83 is moved into engagement with the locking ring 95 so that the spring 94 is held by the rod 85 and so that no force is exerted by the springs 91 and 94 on the stem 57. The stem 57 will, therefore, be moved to the position in which it is shown in Fig. 3 of the drawings, in which position the supply of fluid to the passage 74 is cut off. This prevents unintended operation of the signal whistle 140.

It will be seen that the system provided by this invention provides means responsive to the pressure of the fluid in the signal pipe and adapted to operate a signal on a reduction in the pressure of the fluid in the signal pipe below a predetermined pressure.

It will be seen also that in the system provided by this invention there is a warning device which is controlled by means subject to and operated by a reduction in the pressure of the fluid in the signal pipe for effecting operation of the warning device, and this means is adapted to be conditioned to effect operation of the warning device in response to a reduction in the pressure of the fluid in the signal pipe below different predetermined pressures.

In addition it will be seen that this system provides a braking apparatus having a change-over valve mechanism associated therewith and operable in response to fluid under pressure supplied thereto between different predetermined ranges of pressure to condition the equipment for different classes of service, and has a signal controlled by means subject to and operated by a reduction in the pressure of the fluid supplied to the change-over valve mechanism for effecting operation of the signal, together with means for selectively conditioning the signal controlling means to operate in response to reductions in pressure below different ones of said predetermined ranges of pressure.

In addition the system has means by which the operator may manually acknowledge the signal and cut off its operation, this means being automatically operable upon a restoration of the pressure of the fluid in the signal pipe to condition the signal for operation in the event of another reduction in the pressure of the fluid in this pipe.

While one illustrative embodiment of the braking system provided by my invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure brake equipment, in combination, a brake controlling valve device having change-over mechanism associated therewith and operative in response to fluid under pressure supplied thereto at a value in excess of a predetermined value to vary the operation of the brake controlling valve device, a pair of signals, a device responsive to variations in the pressure of the fluid supplied to the change-over mechanism and controlling one of said signals, said device being adapted to effect operation of the signal controlled thereby in response to reductions in the pressure of the fluid supplied to the change-over mechanism, and a device responsive to the pressure of the fluid supplied to the change-over mechanism and controlling operation of the other of said signals, said last-named device being adapted to effect operation of the signal controlled thereby in response to a reduction in the pressure of the fluid supplied to the change-over mechanism to a value less than a predetermined value.

2. In a fluid pressure brake equipment, in combination, a brake controlling valve device having change-over mechanism associated therewith, the change-over mechanism having a plurality of change-over positions and being selectively movable by fluid under pressure to one or another of said positions according to the degree of fluid pressure supplied thereto, a plurality of signals, a device responsive to variations in the pressure of fluid supplied to the change-over mechanism and controlling operation of one of said signals, said device being adapted to effect operation of the signal in response to reductions in the pressure of the fluid supplied to the change-over mechanisms, and a device responsive to the pressure of the fluid supplied to the change-over mechanism and controlling operation of another of said signals, said device being adapted to effect operation of the signal controlled thereby in response to a reduction in the pressure of the fluid supplied to the change-over mechanism to a value less than a predetermined value.

3. In a fluid pressure brake equipment, in combination, a brake controlling valve device having change-over mechanism associated therewith, the change-over mechanism having a plurality of change-over positions and being selectively movable by fluid under pressure to one or another of said positions according to the degree of fluid pressure supplied thereto, a plurality of signals, a device responsive to variations in the pressure of fluid supplied to the change-over mechanism and controlling operation of one of said signals, said device being adapted to effect operation of the signal in response to reductions in the pressure of the fluid supplied to the change-over mechanism, a device responsive to the pressure of the fluid supplied to the change-over mechanism and controlling operation of another of said signals, and means to condition said device for operation in accordance with the degree of fluid pressure supplied to said mechanism, said device being adapted to effect operation of the signal controlled thereby on a reduction in the pressure of the fluid supplied to the change-over mechanism to a value less than that of the pressure range for which the device is conditioned to operate.

4. In a fluid pressure brake equipment, in combination, a brake controlling valve device having a change-over mechanism associated therewith and operative in response to fluid under pressure supplied thereto at a value in excess of a predetermined value to vary the operation of the brake controlling valve device, a fluid pressure operated signal, a device responsive to the pressure of the fluid supplied to the change-over mechanism and controlling the supply of fluid under pressure to a passage through which fluid may be supplied to the signal, means subject to and operated by the pressure of the fluid supplied to said passage and controlling the supply of fluid through said passage to the signal, manually controlled means for effecting operation of the last named means to cut off the supply of fluid through said passage to the signal, said means being maintained in the position to cut off the supply of fluid to the signal by the pressure of fluid supplied to said passage, and means operable on the release of fluid from said passage to effect operation of said means to establish communication through said passage.

5. In a fluid pressure brake equipment, in combination, a brake controlling valve device having a change-over mechanism associated therewith and operative in response to fluid under pressure supplied thereto at a value in excess of a predetermined value to vary the operation of the brake controlling valve device, a fluid pressure operated signal, a device responsive to the pressure of the fluid supplied to the change-over mechanism and controlling the supply of fluid under pressure to a passage through which fluid may be supplied to the signal, valve means controlling the supply of fluid under pressure through said passage to the signal, said valve means including a movable abutment adapted to be operated by fluid under pressure supplied from said passage to opposite sides of the abutment, and manually controlled means for releasing fluid from one side of the abutment.

6. In a fluid pressure brake equipment, in combination, a brake controlling valve device having a change-over mechanism associated therewith and operative in response to fluid under pressure supplied thereto at a value in excess of a predetermined value to vary the operation of the brake controlling valve device, a fluid pressure operated signal, a device responsive to the pressure of the fluid supplied to the change-over mechanism and controlling the supply of fluid under pressure to a passage through which fluid may be supplied to the signal, valve means controlling the supply of fluid under pressure from said passage to the signal, the valve means including a movable abutment adapted to be operated by fluid under pressure, means for biasing the abutment to a position to permit fluid to be supplied to the signal, means to supply fluid under pressure to opposite sides of the abutment, and manually controlled means for releasing fluid under pressure from one side of the abutment, whereby the abutment is moved by the pressure of the fluid acting on the opposite side of the abutment to a position to cut off the supply of fluid to the signal.

7. In combination, a fluid pressure operated signal, means for supplying fluid under pressure to a passage through which fluid may be supplied to the signal, valve means controlling the supply of fluid to the signal through said passage, the valve means including a movable abutment adapted to be operated by fluid under pressure, means to supply fluid under pressure to opposite sides of the abutment from said passage, and manually controlled means for releasing fluid under pressure from one side of the abutment.

8. In combination, a fluid pressure operated signal, means for supplying fluid under pressure to a passage through which fluid may be supplied to the signal, valve means including a movable abutment adapted to be operated by fluid under pressure for controlling the supply of fluid under pressure from said passage to the signal, means for biasing the abutment to a position to permit fluid to be supplied to the signal, means to supply fluid under pressure to opposite sides of the abutment, and manually controlled means for releasing fluid under pressure from one side of the abutment, whereby the abutment is moved by the pressure of the fluid acting on the opposite side thereof to a position to cut off the supply of fluid to the signal.

9. In a fluid pressure brake equipment, in combination, a brake controlling valve device having a change-over mechanism associated therewith and having a plurality of change-over positions and being selectively movable by fluid under pressure to one or another of said positions according to the degree of fluid pressure supplied thereto, a signal, a device responsive to the pressure of the fluid supplied to the change-over mechanism and controlling operation of the signal, spring means controlling operation of said device, a manually controlled member having a plurality of cam surfaces thereon adapted to control the force exerted by the spring means on said device, each of said cam surfaces being adapted to provide an adjustment of the spring means which is adapted to condition the device to effect operation of the signal on a reduction in the pressure of the fluid supplied to the change-over mechanism below a different predetermined pressure.

10. In a fluid pressure brake equipment, in combination, a control pipe, valve means for supplying fluid under pressure to said control pipe to maintain the pressure of the fluid in said pipe at predetermined values, means to condition said valve means to maintain the pressure of fluid in said control pipe at any one of a plurality of predetermined values, a signal, a device subject to and operated on a predetermined reduction in the pressure of the fluid in said control pipe to effect operation of the said signal, and means for conditioning said device to effect operation of the signal on a predetermined reduction in the pressure of the fluid in the control pipe from the pressures which the said valve means may be condition to maintain, said means comprising a movable member having a plurality of predetermined positions and being operative in each of said positions to condition said device to respond to a reduction in the pressure of the fluid in the control pipe below a different one of the predetermined values which the valve means may be conditioned to maintain.

11. In a signal mechanism, in combination, a fluid pressure operated signal, movable abutment means subject to the opposing pressures of an operating chamber and of a signal chamber for controlling the communication through which fluid under pressure is supplied to said signal chamber, means for supplying fluid under pressure to said chambers, yielding means for opposing movement of the abutment means to close said communication, means for supplying fluid under pressure from the signal chamber to the signal, and manually operated means for releasing fluid under pressure from said signal chamber.

12. In a signal control mechanism, in combination, a fluid pressure operated signal, movable abutment means subject to the opposing pressures of an operating chamber and of a control chamber for controlling communications through which fluid under pressure is supplied to the control chamber and to the signal, yielding means for opposing movement of the abutment means to close the communications through which fluid is supplied to the control chamber and to the signal, means for supplying fluid under pressure to said chambers and to said signal, and manually operated means for releasing fluid under pressure from the control chamber.

13. In a signal control mechanism, in combination, a fluid pressure operated signal, movable abutment means subject to the opposing pressures of an operating chamber and of a control chamber for controlling communications through which fluid under pressure is supplied to the control chamber and to the signal, yielding means for opposing movement of the abutment means to close the communications through which fluid is supplied to the control chamber and to the signal, common means for supplying fluid under pressure to said chambers and to said signal, and manually operated means for releasing fluid under pressure from the control chamber.

14. In a fluid pressure brake equipment, in combination, a control pipe, a pair of fluid pressure operated signals, means subject to and operated on a reduction in the pressure of the fluid in the control pipe to supply fluid under pressure from said control pipe to one of said signals, and a device subject to and operated on a reduction in the pressure of the fluid in the control pipe to a predetermined value to supply fluid from a source other than said control pipe to said other signal.

15. In a fluid pressure brake equipment, in combination, a control pipe, a pair of fluid pressure operated signals, means subject to and operated on a reduction in the pressure of the fluid in the control pipe to supply fluid under pressure from said control pipe to one of said signals, a device subject to and operated on a reduction in the pressure of the fluid in the control pipe to a predetermined value to supply fluid from a source other than said control pipe to said other signal, and manually controlled means to cut off the supply of fluid by said device to said other signal.

16. In a fluid pressure brake equipment, in combination, a control pipe, a pair of fluid pressure operated signals, means subject to and operated on a reduction in the pressure of the fluid in the control pipe to supply fluid under pressure from said control pipe to one of said signals, a device subject to and operated on a reduction in the pressure of the fluid in the control pipe to a predetermined value to supply fluid from a source other than said control pipe to said other signal, and manually controlled means to condition said device to respond to reductions in pressure from different predetermined degrees of pressure carried in said control pipe.

17. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a signal device, and means subject to the pressure of the fluid acting on said change-over valve mechanism adapted to be tuned to operate upon a fall in pressure below that required to move the change-over valve mechanism to said other change-over position for effecting the operation of said signal device to indicate a signal.

18. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a signal device, means subject to the pressure of the fluid acting on said change-over valve mechanism adapted to be tuned to operate upon a fall in pressure below that required to move the change-over valve mechanism to said other change-over position for effecting the operation of said signal device to indicate a signal, and means for tuning said means.

19. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a signal device, means subject to the pressure of the fluid acting on said change-over valve mechanism adapted to be tuned to operate upon a fall in pressure below that required to move the change-over valve mechanism to said other change-over position for effecting the operation of said signal device to indicate a signal, and manually operative means for tuning said means.

20. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a signal device, means subject to the pressure of the fluid acting on said change-over valve mechanism adapted to be tuned to operate upon a fall in pressure below that required to move the change-over valve mechanism to said other change-over position for effecting the operation of said signal device to indicate a signal, and means for cutting said signal indicating device out of operation.

21. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a signal device, means subject to the pressure of the fluid acting on said change-over valve mechanism adapted to be tuned to operate upon a fall in pressure below that required to move the change-over valve mechanism to said other change-over position for effecting the operation of said signal device to indicate a signal, and means under the control of an operator for cutting the signal indicating device out of operation.

22. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a fluid pressure operated signal indicating device, valve means subject to the pressure of fluid acting on said change-over valve mechanism adapted to be tuned to operate upon a fall in pressure below that required to move the change-over valve mechanism to said other change-over position to supply fluid under pressure to the signal indicating device, and means controlled manually for controlling the supply of fluid under pressure to the signal indicating device.

23. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a fluid pressure operated signal indicating device, valve means subject to the pressure of fluid acting on said change-over valve mechanism adapted to be tuned to operate upon a fall in pressure below that required to move the change-over valve mechanism to said other change-over position to supply fluid under pressure to the signal indicating device, and manually controlled fluid pressure operated valve means for cutting off the supply of fluid under pressure to said signal indicating device.

24. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a fluid pressure operated signal indicating device, valve means subject to the pressure of fluid acting on said change-over valve mechanism adapted to be tuned to operate upon a fall in pressure below that required to move the change-over valve mechanism to said other change-over position to supply fluid under pressure to the signal indicating device, and means under the control of an operator for controlling the supply of fluid under pressure to the signal indicating device.

25. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a fluid pressure operated signal indicating device, valve means subject to the pressure of fluid acting on said change-over valve mechanism adapted to be tuned to operate upon a fall in pressure below that required to move the change-over valve mechanism to said other change-over position to establish a communication through which fluid under pressure is adapted to flow to the signal indicating device, a fluid pressure controlled member for cutting off the supply of fluid under pressure to the signal indicating device, and means under the control of an operator for effecting the operation of said member to cut off the flow of fluid to said signal indicating device.

26. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a fluid pressure operated signal indicating device, valve means subject to the pressure of fluid acting on said change-over valve mechanism adapted to be tuned to operate upon a fall in pressure below that required to move the change-over valve mechanism to said other change-over position to establish a communication through which fluid under pressure is adapted to flow to the signal indicating device, a fluid pressure controlled member operative at one time under the control of an operator for closing said communication and operative at another time under the control of said valve means to open said communication.

27. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a fluid pressure operated signal indicating device, valve means subject to the pressure of fluid acting on said change-over valve mechanism adapted to be tuned to operate upon a fall in pressure below that required to move the change-over valve mechanism to said other change-over position to establish a communication through which fluid under pressure is adapted to flow to the signal indicating device, and fluid pressure controlled valve means operative under the control of an operator for cutting off the flow of fluid through said communication, said fluid pressure controlled valve means being maintained in its communication closing position by fluid under pressure from said communication.

28. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a fluid pressure operated signal indicating device, valve means subject to the pressure of fluid acting on said change-over valve mechanism adapted to be tuned to operate upon a fall in pressure below that required to move the change-over valve mechanism to said other change-over position to establish a communication through which fluid under pressure is adapted to flow to the signal indicating device, a valve piston means subject on one side to the pressure of fluid from said communication and subject on the opposite side to the pressure of fluid from said communication and operative upon a reduction in the pressure of fluid on said opposite side to cut off the flow of fluid to said signal indicating device, and means under the control of an operator operative to effect a reduction in the pressure of fluid on said opposite side of the valve piston means.

29. In a fluid pressure brake equipment adapted to be conditioned to function for different classes of train service, in combination, a change-over valve mechanism for selectively conditioning the brake equipment for any one of said classes of service, said mechanism being operative from one change-over position to another by fluid at a predetermined pressure which differs according to the class of train service, a fluid pressure operated signal indicating device, valve means subject to the pressure of fluid acting on said change-over valve mechanism adapted to be tuned to operate upon a fall in pressure below that required to move the change-over valve mechanism to said other change-over position to establish a communication through which fluid under pressure is adapted to flow to the signal indicating device, a valve piston means subject on one side to the pressure of fluid from said communication and subject on the opposite side to the pressure of fluid from said communication and operative upon reduction in the pressure of fluid on said opposite side to cut off the flow of fluid to said signal indicating device, and means under the control of an operator operative to vent fluid under pressure from said opposite side at a rate exceeding the rate at which fluid under pressure flows from the communication to said opposite side to thereby effect a reduction in the pressure of fluid acting on said opposite side.

CLYDE C. FARMER.